United States Patent [19]

Powter et al.

[11] 3,912,880

[45] Oct. 14, 1975

[54] ACOUSTIC MEASUREMENT

[76] Inventors: Edwin John Powter, 16 Monmouth Road, Harlington, Dunstable, Bedfordshire; Robert Humphrey Benton, Brindles, Ufford Place, Lower Ufford, Woodbridge, Suffolk; Eric Abraham Huth, deceased, late of 620 Green Lane, Harringay, London, by Ernestine Ester Huth, legal representative, London, all of England

[22] Filed: July 5, 1974
(Under Rule 47)

[21] Appl. No.: 486,240

[30] Foreign Application Priority Data
July 6, 1973  United Kingdom............ 32370/73

[52] U.S. Cl............................................ 179/175.1 A
[51] Int. Cl............................................. H04r 29/00
[58] Field of Search....... 179/175.1 A, 175.1 R, 175

[56] References Cited
UNITED STATES PATENTS

| 2,629,000 | 2/1953 | Olson et al. | 179/175.1 A |
| 3,267,222 | 8/1966 | Chipp et al. | 179/175.1 A |
| 3,692,959 | 9/1972 | Lamp | 179/175.1 A |

Primary Examiner—William G. Cooper
Assistant Examiner—Douglas W. Olms
Attorney, Agent, or Firm—Kemon, Palmer & Estabrook

[57] ABSTRACT

The frequency response of a microphone can be measured by feeding an acoustic spectrum generated from a pseudo-random bit sequence generator into the microphone and analysing the output using a Fourier analyser. The acoustic spectrum generator is portable and battery operated. A phase locked oscillator system is used to enable the output of a microphone under test to be analysed even after recording on magnetic tape. The device ensures that the sampling rate of the analogue to digital converter feeding the Fourier analyser is locked onto the drive frequency of the pseudo-random bit sequence generator.

21 Claims, 8 Drawing Figures

ACOUSTIC MEASUREMENT

The present invention relates to a method of measuring the frequency response and send loudness rating of an acoustic-electric transducer e.g. a microphone and its associated circuitry, and to apparatus used for performing the measurements.

In order to measure the frequency response of a microphone it is necessary to transmit acoustic signals at a number of different frequencies through the microphone and its associated circuitry and measure the electrical output as a function of frequency. If the microphone under test is subject to changes of frequency response with time, as is the case with some carbon microphones, the measurements must be performed rapidly if the results are to be capable of interpretation. One way of doing this is to feed a continuous acoustic frequency spectrum into the microphone and analyse the results using Fourier analysis or Fourier transforms. If white noise is used, repeated measurements must be taken and averaged to eliminate the effects of random fluctuations. However by using an acoustic spectrum of discrete frequencies having a well defined envelope, this disadvantage may be avoided. Such a spectrum may be generated by using a pseudo random binary sequence generator.

If measurements of this type are to be made on telephone transmitters in the field it is necessary for the acoustic generator to be easily portable and to operate on a built-in power supply. The output from the transmitter may be received at the exchange and either recorded, on a magnetic tape for example, or analysed as it is received. To avoid problems in accurately positioning the acoustic generator in a predetermined position relative to the microphone under test, the acoustic generator is adapted to seal on to the microphone under test.

According to a first aspect of the present invention there is provided a system for measuring a frequency response of an acoustic-electric transducer and associated circuitry including an acoustic generator adapted to be sealed to an acoustic-electric transducer housing, said acoustic generator arranged to generate an acoustic signal having a plurality of discrete sinusoidal frequencies; receiver means electrically connected to said acoustic-electric transducer and associated circuitry for receiving an electrical output from said acoustic-electric transducer and associated circuitry and feeding a signal related to said electrical output to an analogue to digital converter having a first sampling means operable to sample a received signal at a variable sampling rate; control means connected to said sampling means for controlling said variable sampling rate in response to variations in frequency of said received signal; a Fourier analyser means, connected to an output of said analogue to digital converter and arranged to derive the frequency response of said acoustic electric transducer.

According to a second aspect of the present invention there is provided a method of measuring a frequency response of an acoustic-electric transducer and associated circuitry comprising the steps of:

a. feeding an acoustic signal comprising a plurality of discrete sinusoidal frequencies into said acoustic electric transducer, b. sampling an electric signal derived from said acoustic electric transducer at a sampling rate controlled by a first signal derived from said electric signal, to produce a sequential series of samples of said electric signal, c. converting said sequential series of samples into a sequence of numbers, each number representative of an amplitude of a sample, d. Fourier analysing said digital sequence of numbers to produce a sequence of numbers representing said frequency response.

According to a third aspect of the present invention there is provided a portable acoustic generator including spacer means for positioning an electric-acoustic transducer at a predetermined distance from an acoustic-electric transducer to be tested, generator means electrically connected to said acoustic-electric transducer for generating a plurality of discrete sinusoidal frequencies, and a battery power supply for powering said generator means.

According to a fourth aspect of the present invention there is provided a frequency analyser for use with the system claimed in any of claims 1 to 8 said frequency analyser comprising an analogue to digital converter having a first sampling means operable to sample a received signal at a variable sampling rate, control means connected to said sampling means for controlling said variable sampling rate in response to variations in frequency of said received signal, and a Fourier analyser means connected to an output of said analogue to digital converter.

A preferred embodiment of the invention will now be described, by way of example, with reference to the accompanying drawings, in which.

Figure 1:
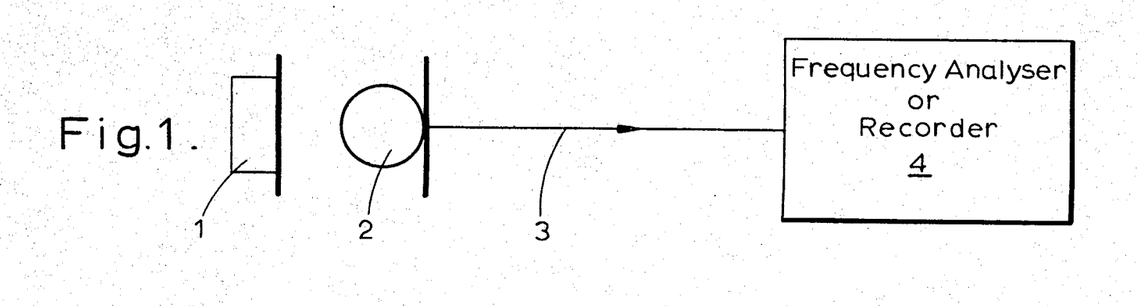
FIG. 1 shows a diagrammatic form a system for measuring the frequency response of a microphone and associated wiring.

Referring now to the drawings and FIG. 1 in particular, an acoustic generator 1 is placed in contact with a microphone 2 and its associated wiring 3, whose frequency response is to be measured. The electric output of the microphone may be recorded e.g. on magnetic tape, or fed directly to a frequency analyser. When the system is used to calibrate a telephone handset microphone the recorder or frequency analyser may conveniently be located at a telephone exchange. The results obtained can be presented directly in the form of a frequency response for the microphone and associated wiring (e.g. for a telephone, the line to the exchange), or send loudness ratings may be determined by processing the data obtained in a digital computer.

Figure 7:
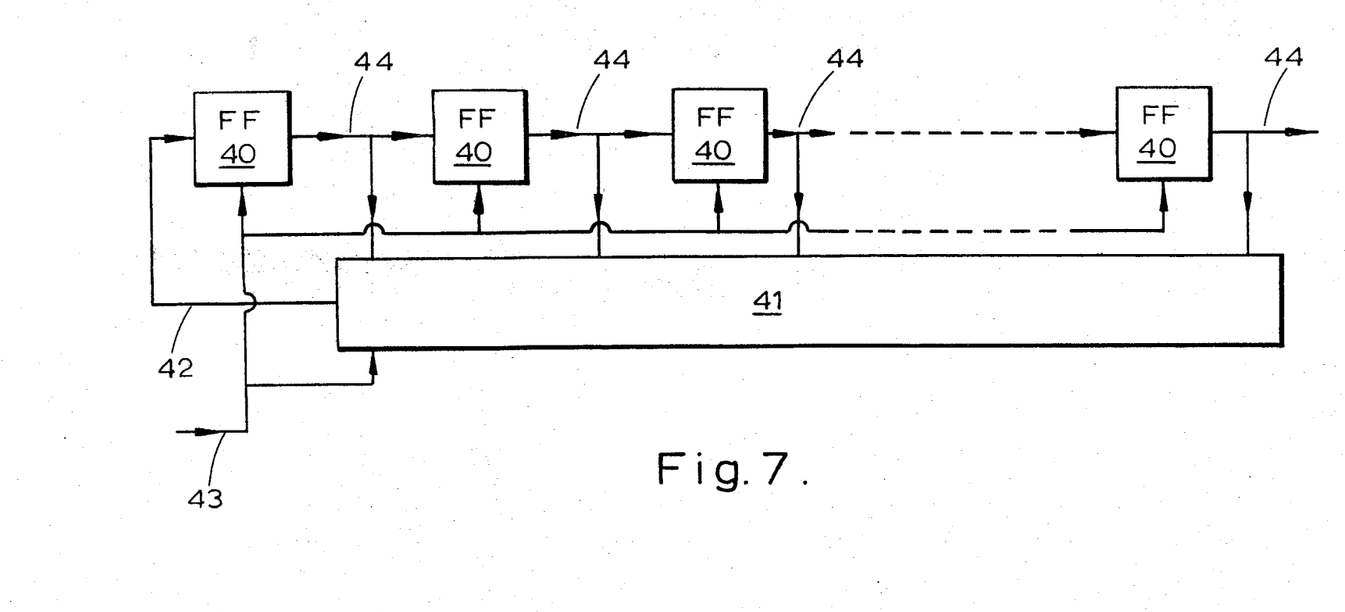
FIG. 7 shows a block diagram of a pseudo-random binary sequence generator.

In order to obtain measurements over a range of frequencies in a short time it is necessary to generate an acoustic spectrum in which a plurality of frequencies are simultaneously present. The most obvious way to do this is to use a white noise generator. However there are certain disadvantages associated with this technique, namely the accuracy of the measurements is directly related to the time the measurements take to perform i.e. repeated scans of the acoustic spectrum have to be carried out and the results averaged, in order to obtain a stable result. This disadvantage may be avoided using an acoustic spectrum which contains a number of equi-spaced discrete frequencies. Such a spectrum can be generated by a pseudo random binary sequence generator of the type shown in FIG. 7.

Figure 2:
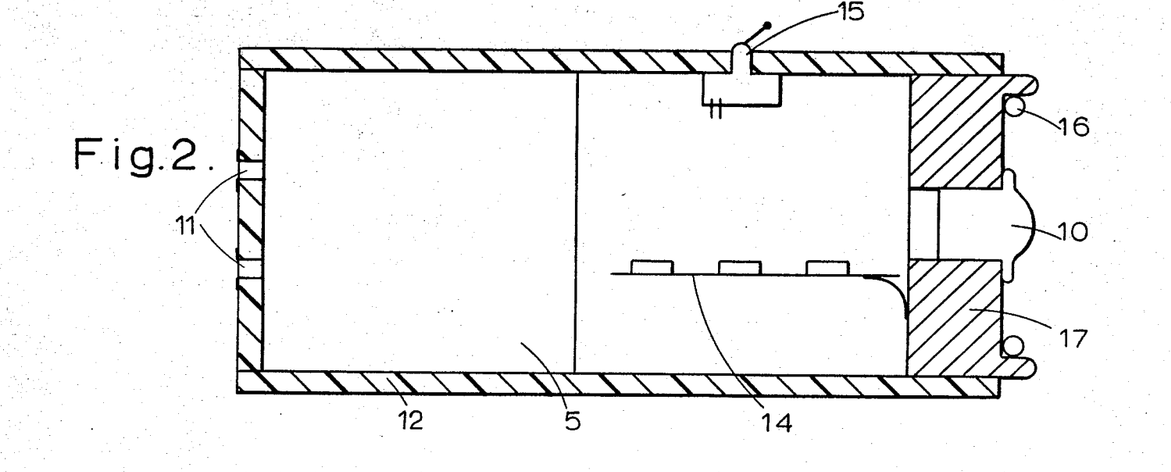
FIG. 2 shows a section through an acoustic generator according to the invention.
Figure 3:
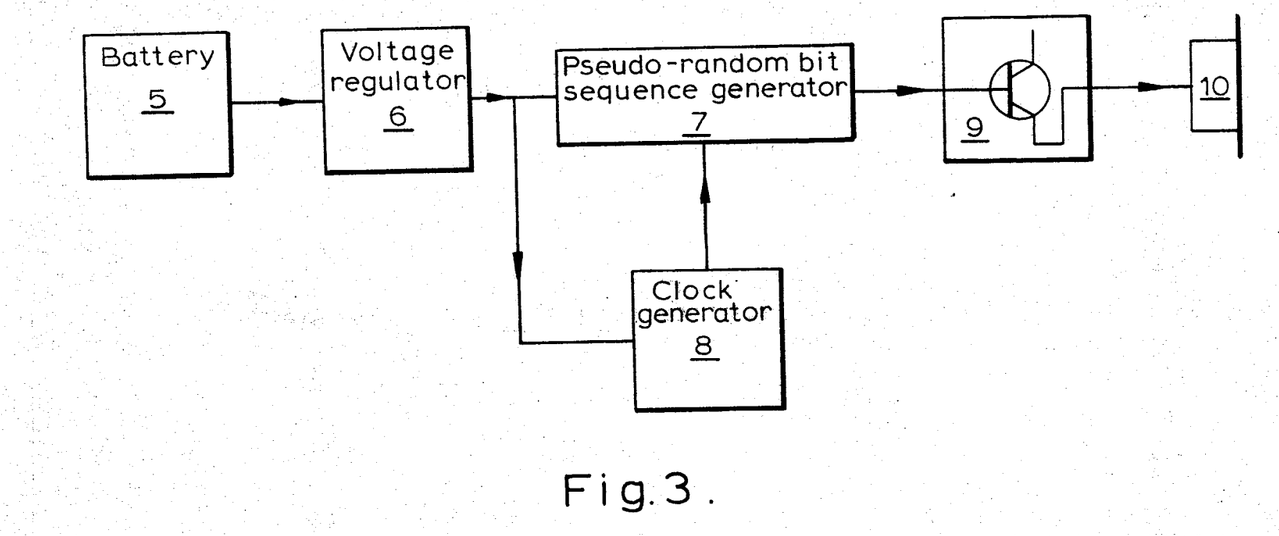
FIG. 3 shows a block diagram of the electric circuit of an acoustic generator according to the invention.
Figure 4A:
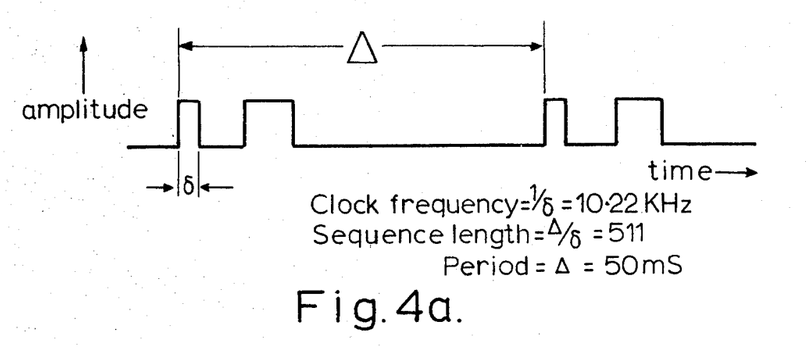
FIG. 4a and 4b show respectively the electrical driving waveform fed to the transducer and its corresponding power spectral density characteristic.
Figure 4B:
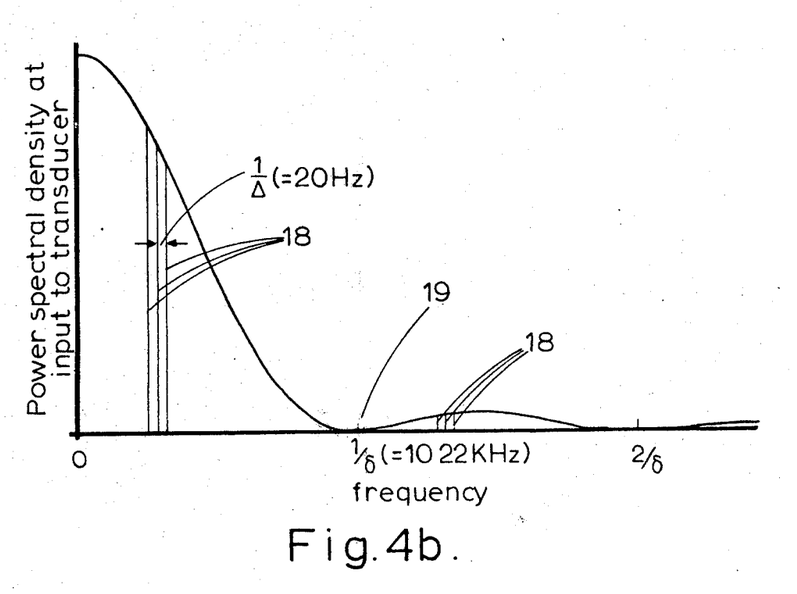

A typical pseudo-random binary sequence generator consists of a number of flip-flops 40 forming an n-stage shift register, with the flop-flop outputs, 44, connected to logic gates 41, which may include exclusive OR gates and flip-flops. The output of the logic gates, 41, are fed back on line 42 to the 1st flip-flop The input of the feedback shift register thus formed, on line 43 is a series of clock pulses. The pseudo-random binary sequence is generated at the output of any stage of the register 44. A circuit employing such a pseudo-random binary sequence generator for generating an acoustic spectrum is shown in FIG. 3. The circuit can be made up as a portable manually manipulatable unit as shown in section in FIG. 2. The circuit comprises a battery 5 which feeds a voltage regulator 6 which in turn supplies power to a pseudo random bit sequence generator 7 and a clock pulse generator 8. The shift register of the pseudo random binary sequence generator 7 is clocked by clock pulse generator 8. The output electric acoustic transducer is fed with the output of the pseudo random bit sequence generator 7 via a transistor 9. The transducer 10 is a moving coil microphone having a good response up to 8 KHz, mounted in an aluminium housing 17 (see FIG. 2). The batteries are rechargeable nickel-cadmium cells. A battery state indicator may be incorporated to give an indication when the battery voltage has fallen below a usable value. The whole unit may be mounted in a cylindrical tube 12. Charging terminals 11 are provided in the rear plate 13 of the cylindrical tube. The electric circuits for the pseudo random bit sequence generator, voltage regulator, etc. are mounted on a circuit board 14. An ON-OFF switch 15 is mounted in the wall of the cylinder 12. A sealing and spacer ring 16 is provided to enable the unit to be sealed to, and separated by a predetermined distance from, the housing of a microphone under test. The pseudo-random binary sequence generator is a 9 stage shift register having feedback connections designed to give a finite periodic sequence of maximum length shown in FIG. 4a. The logic gates, 41, being exclusive OR gates with inputs, 44, from the fifth and ninth flip-flops, 40. The sequence length is given by $2^{n}-1$ where $n$ is the number of stages. In this case the sequence length is 511. The envelope shape of the electric power spectrum fed to the acoustic electric transducer, (see FIG. 4b) is of the form $(\sin x/x)^2$, where $x=\pi f \delta$, $f$ is frequency and $1/\delta$ is the clock frequency. The first null, 19, in the envelope occurs at the clock frequency at which the shift register of the pseudo random bit sequence generator is driven. There are 511 discrete frequencies, 18, in spectrum between zero frequency and the first null in the spectrum envelope. These frequencies are equi-spaced with a separation of 20 Hz.

Figure 5:
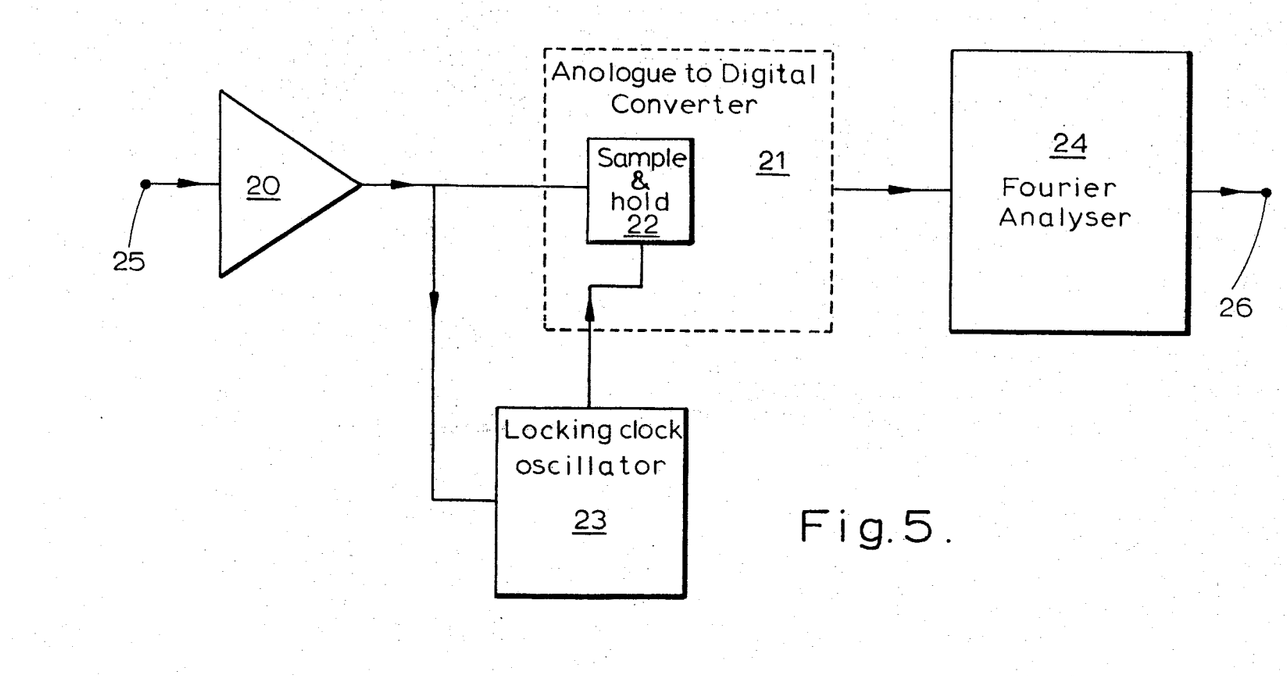
FIG. 5 shows a block diagram of a frequency analyser according to the invention.

In order to obtain the frequency response of the microphone and associated circuitry it is necessary to determine the amplitude of the different frequencies generated by the acoustic generator after transmission through the microphone. This can be done either by feeding the output of the microphone direct to a frequency analyser or by first recording the output and then subsequently feeding it to a frequency analyser. A frequency analyser suitable for use in this system is illustrated diagrammatically in FIG. 5. The signal to be analysed is fed to the input 25 of the frequency analyser and thence to amplifier 20 which may include a low pass filter. The output of the amplifier is fed to an analogue to digital converter 21 having a sample and hold unit 22. The sampling frequency of the analogue to digital converter is variable and controlled by a locking clock oscillator 23 which locks onto the sequence repetition frequency of the pseudo-random bit sequence generator. The digital output of the analogue to digital converter which represents the waveform of the input at terminal 25 is fed to a Fourier analyser 24 which may include a digital computer. The amplitude of the various frequency components in the received spectrum is determined from the output of the Fourier analyser. When pseudo random noise is used, this has the defined frequency spectrum of FIG. 4b (providing the measurement is made over one complete sequence length) and if the Fourier analyser is arranged to have a frequency resolution of 20 Hz there will always be a signal present of the particular frequency at which the analyser is looking. Consequently the measurement can be completed in just one sample. Another way of looking at this process is to consider the pseudo-random binary sequence as a combination of discrete sinewaves 20 Hz apart and the analyser as a set of very narrow filters 20 Hz apart. A simultaneous sinewave test is then done at all these frequencies and the result displayed.

The pseudo-random binary sequence only has its said defined frequency spectrum if a complete sequence (in this case 511 bits) is considered. The Fourier analyser does all its calculations on blocks of data, and each block can contain $2^n$ points where $n$ is an integer. The nearest block size to the pseudo random bit sequence length is 512 and it might be thought that the small discrepancy between block size and sequence length would be unimportant. In fact the traditional procedure for using a pseudo random binary sequence source with a Fourier analyser is to drive both the source and analogue to digital converter from the same clock generator, setting the frequency discrimination controls on the analogue to digital converter to the expected spectrum line density of the source (20 Hz). When this is done a result is obtained, but there is some uncertainty at the high frequencies, due to the spectral line density of the pseudo random bit sequence being upset by the inclusion of an extra bit in the analyser block (i.e. the analyser processes one complete sequence plus the first bit of the next sequence). To get over this problem the pseudo-random binary sequence clock is slowed down, so that the total time taken for the pseudo random sequence period equals that for the analyser sample.

For a frequency discrimination of 20 Hz, and a maximum input frequency of 5.12 KHz, the analyser samples at a 10.24 KHz rate, so the total time for a block of sample to be read in is $512/10.24 = $ mS.

If the pseudo random bit sequence length is 511, the required clock frequency $= 511/50 = 10.22$ KHz. When this clock frequency is used for the pseudo random binary sequency generator good results are obtained from just one block of 512 samples. It will be appreciated that this ratio of clock frequencies, 10.22

KHz to 10.24 KHz is very critical as any slight deviation would cause the apparent spectral line density as measured on the analyser to change. In the ideal case one frequency would be derived from the other using phase locked loop techniques, but of course this is not possible when one clock is contained in a portable piece of equipment. Another solution would be to use highly stable crystal oscillators for both clocks, and although fine in principle this does not allow for any apparent frequency shift of the portable device if its output is tape recorded (when some wow, flutter etc may be present). The problem is overcome by constructing a locking clock oscillator, shown in FIG. 6.

The output from the pseudo random bit sequence generator, whether having gone through a system or not always repeats itself after 50 mS, so if the output is sampled every 50 mS it should have the same value, provided the system parameters are not time dependent. If the pseudo-random binary sequence clock drifts so that the sequence repetition rate is not 50 mS, an oscillator driving the sample mechaninsm can be arranged to track so that equality of successive samples is preserved.

Figure 6:
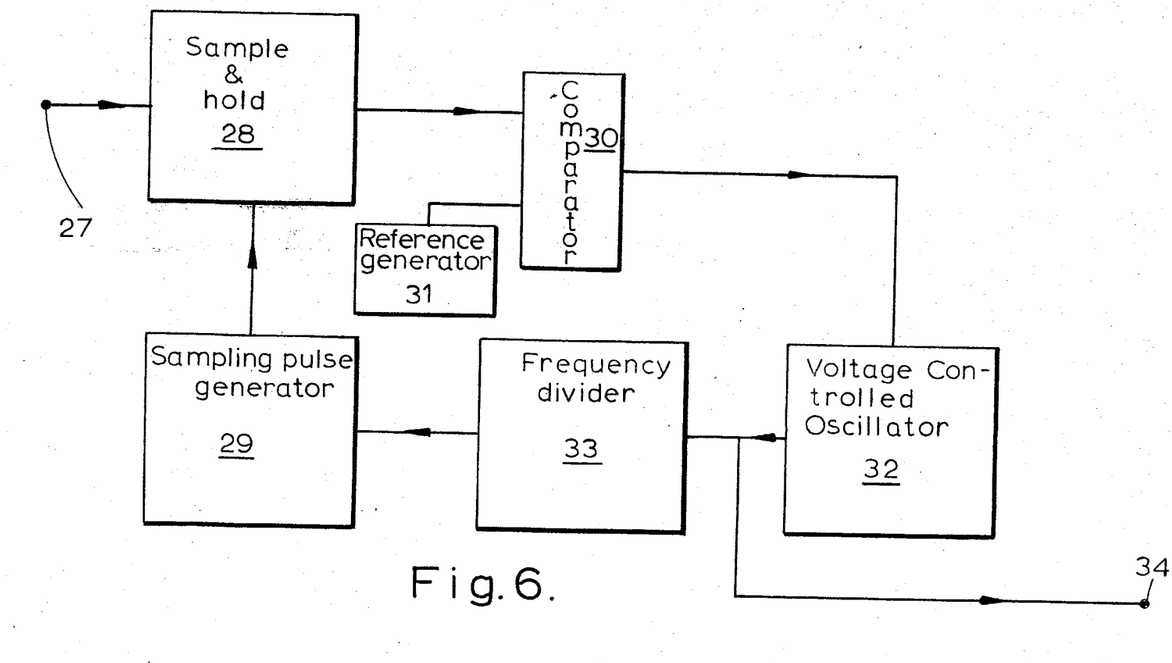
FIG. 6 shows a block diagram of a sampling unit control circuit.

In the locking clock unit, shown in FIG. 6, the received signal is fed via input 27 to a sample and hold unit 28 adjusted to sample at approximately 50 mS intervals. The output of the sample and hold mechanism is fed to a comparator 30 where the level of the sampled signal is compared with a reference signal generated by reference generator 31. A difference signal proportional to any deviation from the reference value is fed to a voltage controlled oscillator 32 having a frequency of about 1.024 MHz The oscillator output is fed to a divide by 51,200 circuit 33. The output of the divide by 51,200 circuit controls sample pulse generator 29 which in turn controls the sample and hold unit 28. If the frequency of the clock driving the pseudo-random binary sequence generator drifts, a voltage is produced at the output of the comparator 30 which causes the frequency of oscillator 32 to follow the frequency drift of the pseudo-random binary sequence generator clock. This causes the sampling rate of sample and hold unit 28 to change until balance is restored. The output of the locking clock unit is taken from output terminal 34 and used to drive the sample and hold unit 22 of the analogue to digital converter. Thus the sampling rate of the analogue to digital converter tracks the frequency of the pseudo-random binary sequence generator.

In order to convert the results obtained with this system into absolute units e.g. output voltage in terms of pressure at a predetermined distance in front of the microphone, it is necessary to calibrate the acoustic generator. This may be done by first calibrating a linear microphone using an artificial mouth, and then measuring the frequency response of the same microphone using the acoustic generator. By comparing the known frequency response of the microphone with the measured value, calibration factors can be determined at each frequency.

The same system used for the determination of the frequency response of a microphone and associated wiring may also be used for determining the send loudness rating. The determination of the loudness rating is based on an integration over frequency, weighted to account for the sensation level, (i.e. the difference between the sound pressure produced by the signal at the ear and the pressure associated with the threshold of hearing). The weighting factors for each frequency band are built into a computer with some modification to simplify the arithmetic. These weighting factors, multiplied by the system sensitivity on a block basis, and the resultant answer integrated over the frequency range, give after appropriate scaling, a measure of the send loudness.

What is claimed is:

1. A system for measuring a frequency response of an acoustic-electric transducer and associated circuitry including an acoustic generator adapted to be sealed to an acoustic-electric transducer housing, said acoustic generator arranged to generate an acoustic signal having a plurality of discrete sinusoidal frequencies; receiver means electrically connected to said acoustic-electric transducer and associated circuitry for receiving an electrical output from said acoustic-electric transducer and associated circuitry and feeding a signal related to said electrical output to an analogue to digital converter having a first sampling means operable to sample a received signal at a variable sampling rate; control means connected to said sampling means for controlling said variable sampling rate in response to variations in frequency of said received signal; a Fourier analyser means, connected to an output of said analogue to digital converter and arranged to derive the frequency response of said acoustic electric transducer.

2. A system as claimed in claim 1 wherein said receiver means includes a recorder for recording said electrical output on a recording medium and playback means for regenerating said electric output from said recording medium.

3. A system as claimed in claim 2 wherein said acoustic generator includes a pseudo-random binary generator having a finite, sequence repetition frequency, electrically coupled to an electro-acoustic transducer.

4. A system as claimed in claim 3 wherein said frequency of said received signal is said finite sequence repetition frequency.

5. A system as claimed in claim 4 wherein said control means includes a comparator having a first input connected to an output of a second sampling means, a second input connected to a reference level generator means, an output of said comparator connected to a voltage controlled oscillator means coupled to both said first and second sampling means and arranged to control said variable sampling rate.

6. A system as claimed in claim 5 wherein said recording medium is magnetic tape.

7. A system as claimed in claim 1 wherein said acoustic generator is powered by a battery.

8. A system as claimed in claim 7 wherein said acoustic-electric transducer and associated circuitry is a telephone microphone and associated connections of said telephone microphone to a telephone exchange.

9. A method of measuring a frequency response of an acoustic-electric transducer and associated circuitry comprising the steps of:
  a. feeding an acoustic signal comprising a plurality of discrete sinusoidal frequencies into said acoustic electric transducer,
  b. sampling an electric signal derived from said acoustic electric transducer at a sampling rate controlled by a first signal derived from said electric signal, to produce a sequential series of samples of said electric signal, c. converting said sequential series of samples into a sequence of numbers, each number representative of an amplitude of a sample, d. Fourier analysing said digital sequence of numbers to produce a sequence of numbers representing said frequency response.

10. A method as claimed in claim 9 wherein an electric output of said acoustic-electric transducer is recorded on a recording medium, and said electric signal is derived from said recording medium.

11. A method as claimed in claim 10 wherein said acoustic signal comprises a pseudo-random binary sequence repeating with a substantially constant frequency.

12. A method as claimed in claim 11 wherein said first signal is related to said substantially constant frequency.

13. A method as claimed in claim 12 wherein each number of said sequence of numbers representing said frequency response is multiplied, in a digital computer, by a weighting factor, to produce a sequence of weighted numbers, and integrating said sequence of weighted numbers to produce a number representing a send loudness rating for said acoustic electric transducer.

14. A method as claimed in claim 13 wherein said recording medium is magnetic tape.

15. A method as claimed in claim 14 wherein said acoustic-electric transducer and associated circuitry is a telephone microphone and associated connections of said telephone microphone to a telephone exchange.

16. A portable acoustic generator for use with the system claimed in claim 1 said portable acoustic generator including spacer means for positioning an electric-acoustic transducer at a predetermined distance from an acoustic-electric transducer to be tested, generator means electrically connected to said acoustic-electric transducer for generating a plurality of discrete sinusoidal frequencies, and a battery power supply for powering said generator means.

17. A portable acoustic generator as claimed in claim 16 wherein said spacer means is arranged to seal said portable acoustic generator to a housing holding said acoustic-electric transducer.

18. A portable acoustic generator as claimed in claim 17 wherein said generator means comprises a pseudo-random binary sequence generator.

19. A portable acoustic generator as claimed inn claim 18 enclosed in a case so dimensioned as to be manually manipulatable.

20. A frequency analyser for use with the system claimed in claim 1 said frequency analyser comprising an analogue to digital converter having a first sampling means operable to sample a received signal at a variable sampling rate, control means connected to said sampling means for controlling said variable sampling rate in response to variations in frequency of said received signal, and a Fourier analyser means connected to an output of said analogue to digital converter.

21. A frequency analyser as claimed in claim 20 wherein said control means includes a comparator having a first input connected to an output of a second sample means, a second input of said comparator connected to a reference level generator means, an output of said comparator connected to a voltage controlled oscillator means, said voltage controlled oscillator means coupled to both said first and second sampling means and arranged to control said variable sampling rate.

* * * * *